US007039611B2

(12) United States Patent
Devine

(10) Patent No.: US 7,039,611 B2
(45) Date of Patent: May 2, 2006

(54) MANAGING ATTEMPTS TO INITIATE AUTHENTICATION OF ELECTRONIC COMMERCE CARD TRANSACTIONS

(75) Inventor: Sue Devine, Foster City, CA (US)

(73) Assignee: Visa U.S.A., Inc., San Francisco, CA (US)

( * ) Notice: Subject to any disclaimer, the term of this patent is extended or adjusted under 35 U.S.C. 154(b) by 0 days.

(21) Appl. No.: 10/704,331

(22) Filed: Nov. 6, 2003

(65) Prior Publication Data

US 2005/0102234 A1    May 12, 2005

(51) Int. Cl.
G06Q 40/00 (2006.01)
(52) U.S. Cl. .......................................... 705/44; 705/67
(58) Field of Classification Search ................. 705/39, 705/44, 64, 65, 67; 235/380
See application file for complete search history.

(56) References Cited

U.S. PATENT DOCUMENTS

| | | | | |
|---|---|---|---|---|
| 4,825,052 A | * | 4/1989 | Chemin et al. | 235/380 |
| 5,826,245 A | * | 10/1998 | Sandberg-Diment | 705/44 |
| 6,327,578 B1 | * | 12/2001 | Linehan | 705/65 |
| 6,805,289 B1 | * | 10/2004 | Noriega et al. | 705/44 |
| 2001/0056409 A1 | * | 12/2001 | Bellovin et al. | 705/64 |
| 2002/0013765 A1 | * | 1/2002 | Shwartz | 705/39 |
| 2003/0042301 A1 | * | 3/2003 | Rajasekaran et al. | 235/380 |
| 2004/0019570 A1 | * | 1/2004 | Bolle et al. | 705/64 |

FOREIGN PATENT DOCUMENTS

JP        2002300311 A  * 10/2002

OTHER PUBLICATIONS

"Digital siganture management", Hassler et al, Internet Research, vol. 9, No. 4, pp. 262-271 (1999).*
"Authentication gets tough", Ross et al, Network Computing, p. 97, (May 28, 2001).*

* cited by examiner

Primary Examiner—Salvatore Cangialosi
(74) Attorney, Agent, or Firm—Townsend and Townsend and Crew LLP

(57) ABSTRACT

To encourage widespread implementation of an electronic commerce card authentication system by the numerous different card issuers and merchants, the card association assigns liability for fraudulent transaction based upon a party's compliance with the authentication system. To enable this feature, an embodiment of the card processing system includes the ability to track and record attempts by merchants to initiate authentications, even in circumstances where the card issuer does not support authentication or can not authenticate the card information its receives. A directory server determines whether a card account is capable of being authenticated. If the card issuer cannot authenticate the card account, the directory server instructs the merchant system to attempt authentication with an alternate access control server. The alternate access control server is adapted to communicate an authentication response message with the merchant system indicating that the merchant system attempted an authentication.

20 Claims, 2 Drawing Sheets

MANAGING ATTEMPTS TO INITIATE AUTHENTICATION OF ELECTRONIC COMMERCE CARD TRANSACTIONS

BACKGROUND OF THE INVENTION

Electronic commerce cards are frequently used by consumers to make purchases from merchants over the Internet. Electronic commerce cards include credit cards, debit cards, prepaid purchase cards, travel cards, or any other system that can be used instead of cash to purchase goods or services. To prevent fraud, electronic commerce card associations and/or issuers have instituted authentication systems to ensure that electronic commerce cards are only used by authorized cardholders. One example of an authentication system enables a cardholder to associate a password or other identifying information with an electronic commerce card. To make a purchase online, the consumer must provide the password associated or other identifying information with the electronic commerce card. This ensures that the person possessing the electronic commerce card is actually authorized to use the electronic commerce card.

Typical card processing systems use a decentralized, distributed computing model in which information is exchanged between merchants, electronic commerce card issuers and the card association to authenticate cardholders. Because of the distributed nature of the card processing system, authentication will fail if any portion of the system, such as a merchant system or a card issuer system, does not support its portion of the authentication. With thousands of card issuers and millions of merchants using a typical card processing system, deploying an authentication system among so many different entities is a difficult task. Additionally, merchants are reluctant to include authentication functions if the authentication system is only supported by a small number of card issuers.

It is therefore desirable to have an incentive for merchants and card issuers to implement an authentication system. It is further desirable that the authentication system provide merchants with proof of compliance with the authentication system.

BRIEF SUMMARY OF THE INVENTION

To encourage widespread implementation of the authentication system by the numerous different card issuers and merchants, in an embodiment of the invention the card association assigns liability for fraudulent transaction based upon a party's compliance with the authentication system. For example, liability for fraudulent transactions is borne by the card issuer and not the merchant when the merchant complies with the authentication system, even in cases where the card issuer does not support authentication. To enable this feature, an embodiment of the card processing system includes the ability to track and record attempts by merchants to initiate authentications, even in circumstances where the card issuer does not support authentication or can not authenticate the card information its receives.

In an embodiment, an electronic commerce card authentication system includes a directory server adapted to receive a verification request message from a merchant system. The verification request message requests an indication of whether a card account is capable of being authenticated. The directory server is further adapted to determine whether the card account is capable of being authenticated and to communicate a verification response message with the merchant system in response to a determination that the card account is not capable of being authenticated. The verification response message instructs the merchant system to submit an authentication request to an attempts access control server. The attempts access control server is adapted to receive authentication requests from merchant systems when an access control server associated with the card account is unable to authenticate the card account.

In an embodiment, the electronic commerce card authentication system also includes an access control server adapted to receive an authentication request message from the merchant system and to communicate an authentication response message with the merchant system. The authentication response message includes an indication that the merchant system attempted an authentication. Additionally, another embodiment of the access control server is further adapted to communicate a copy of the authentication response message with an authentication history server to be archived. In a further embodiment of the electronic commerce card authentication system, the verification response message indicates the location of the access control server. In still another embodiment, the access control server is further adapted to validate the authentication request message.

In an additional embodiment of the electronic commerce card authentication system, the directory server is further adapted to communicate the verification request message with an access control server associated with the card issuer associated with the card account. In response to a determination that the access control server is inoperable, the directory server is adapted to communicate a verification response message with the merchant system. The verification response message includes an indication that an authentication should be attempted.

Still another embodiment of the electronic commerce card authentication system includes an access control server adapted to receive the verification request message from the directory server, determine whether the card account is capable of being authenticated, and communicate a verification response message with the merchant system in response to a determination that the card account cannot be authenticated. The verification response message includes an indication that an authentication should be attempted with a different access control server. The access control server is adapted to alternately communicate a verification response message with the merchant system in response to a determination that the card account can be authenticated, wherein the verification response message includes an indication that an authentication should be attempted with the access control server.

A further embodiment of the electronic commerce card authentication system includes an electronic commerce card association adapted to assign liability for a potentially fraudulent transaction to a card issuer in response to the authentication response message that includes an indication that the merchant system attempted an authentication.

BRIEF DESCRIPTION OF THE DRAWINGS

The invention will be described with reference to the drawings, in which.

DETAILED DESCRIPTION OF THE INVENTION

Figure 1:
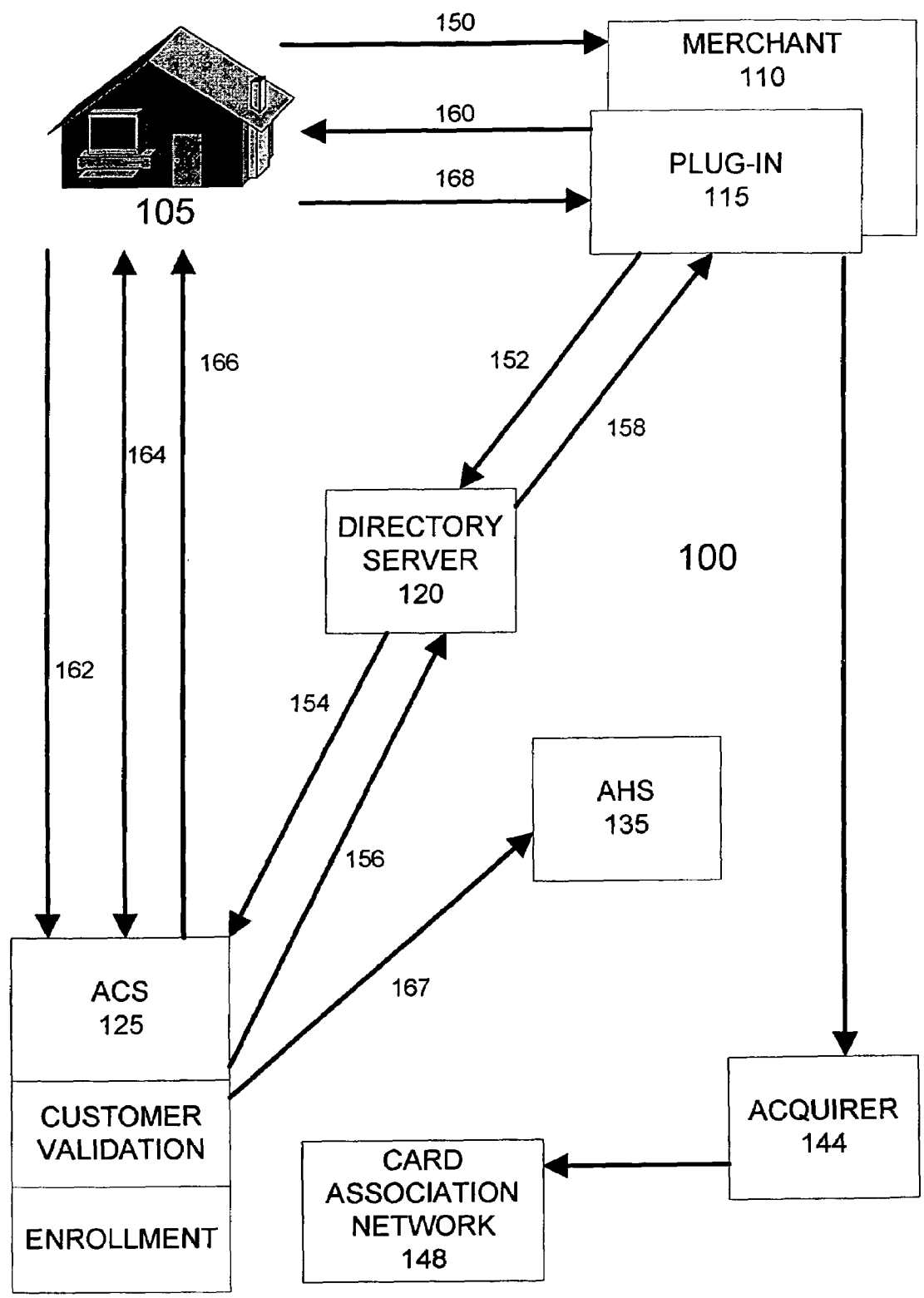
FIG. 1 illustrates a decentralized card processing system.

FIG. 1 illustrates a decentralized card processing system 100. System 100 enables cardholders to be authenticated when making electronic commerce card purchases online. Cardholder system 105 initiates an online purchase by accessing a merchant computer 110. In an embodiment, cardholder system 105 accesses a website provided by the merchant computer 110 via the Internet via a web browser. The cardholder system 105 can be any type of communications device, for example a personal computer, a personal digital assistant, or a telephone.

To complete a purchase, a cardholder uses the cardholder system 105 to submit her electronic commerce card information 150, such as a card number and expiration date, to the merchant system 110. In an embodiment, a secure communication system, such as SSL, is used for all communications, including the electronic commerce card information 150.

In response to the electronic commerce card information 150, the merchant system initiates an authentication procedure to determine whether the electronic commerce card information is valid and has been provided by an authorized cardholder. In an embodiment of system 100, there are numerous electronic commerce card issuers. Each electronic commerce card issuer is responsible for authenticating its own electronic commerce cards.

To authenticate the electronic commerce card information 150, the merchant system 110 must locate the authentication service, if any, of the electronic commerce card issuer associated with the electronic commerce card information 150. A directory server 120 maintains a directory specifying the location and capabilities of all card issuer systems in the card processing system 100. The capabilities of card issuer systems include whether the card issuer system supports authentication.

The merchant system sends a verifying enrollment request (VEReq) 152 to a directory server 120 to locate the appropriate card issuer system. In an embodiment, all authentication-related communication is coordinated by an authentication plug-in 115 integrated with the merchant system 110. The VEReq 152 includes at least a portion of the electronic commerce card information 150 to be used by the directory server 120 to identify the card issuer system associated with the cardholder's electronic commerce card. In an embodiment, each electronic commerce card issuer is assigned a different range of electronic commerce card numbers. This embodiment of the directory server 120 includes a list of all electronic commerce card issuers and their associated electronic commerce card number ranges. By comparing the electronic commerce card information with the list of electronic commerce card issuers, the directory server 120 is able to identify the appropriate card issuer system.

After identifying the card issuer system, the directory server 120 determines if the card issuer supports authentication. If the card issuer does not support authentication, then the authentication process is halted. Otherwise, the directory server 120 forwards the VEReq 154 to an access control server (ACS) 125 associated with the card issuer's authentication service. The ACS 125 determines whether the card information provided in the VEReq 154 can be authenticated. Card information may not be able to be authenticated by the ACS 125 if, for example, the card information does not include a valid electronic commerce card number, or if there is no authentication information, such as a password or other identifying information, associated with the electronic commerce card number.

If the electronic commerce card information provided in the VEReq 154 can be authenticated, the ACS 125 sends a verified enrollment response (VERes) 156 back to the directory server 120. The VERes 156 includes a message indicating that the ACS 125 can authenticate the electronic commerce card information and a pseudonym corresponding to the card number. The pseudonym can be any type of code or number that can be uniquely linked to card information by the ACS 125 at a later time. The VERes also includes a URL to be accessed by the cardholder system 105 to authenticate the cardholder. For system 100, the URL is associated with a web site provided by the ACS 125. Upon receiving a VERes from the ACS 125, the directory server 120 forwards the VERes 158 to the merchant system 110.

From the received VERes, the merchant system 110 generates an authentication request. The authentication request includes the pseudonym created by the ACS 125 and transaction information associated with the cardholder's prospective purchase. The merchant system then forwards the authentication request 160 to the cardholder system 105. In an embodiment, the authentication request is sent to the cardholder system 105 with a web page having a redirection command, such as an HTTP redirect, to a web site hosted by the ACS 125. This web page also includes a URL for returning information to the merchant system 110.

In response the authentication request received from the merchant system 110, the cardholder system 105 accesses 162 a web site hosted by the ACS 125. In accessing this web site, the cardholder system 105 supplies the ACS 125 with the pseudonym originally created by the ACS for the VERes.

The cardholder to authenticates her identity by presenting authentication information 164 to the web site provided by the ACS 125. In an embodiment, the cardholder authenticates her identity by providing to the ACS 125 a password or other identifying information previously associated with the electronic commerce card. The ACS 125 uses the pseudonym provided by the cardholder system to identify the electronic commerce card being supplied by the cardholder and retrieve authentication information previously associated with the electronic commerce card. In an embodiment, the ACS 125 matches the pseudonym received via the authentication request 162 with the pseudonym previously created for VERes 156. In a further embodiment, the pseudonym expires after a limited period of time, for example five minutes, to prevent fraudulent reuse of the authentication request.

The ACS 125 returns an authentication response 166 to the cardholder system 105. The cardholder system 105 in turn forwards the authentication response 168 to the merchant system 110. If the authentication information 164 provided by the cardholder matches the authentication information previously associated with the electronic commerce card, the authentication response includes a message indicating that the authentication was successful. Alternatively, the authentication response can include a message indicating that the authentication failed. In a further embodiment, the authentication response may also include an error code identifying the reason for authentication failure.

In addition to sending the authentication response to the merchant system 110, a copy of the authentication response 167 is sent to an authentication history server 135. The authentication history server 135 maintains an archive of all authentications performed by the system 100. The authentication response is digitally signed to prevent the cardholder system 105 or other third party systems from tampering with the contents of the authentication response.

After receiving the authentication response 168, the merchant system 110 validates the authentication response. To validate the authentication response 168, the merchant system 110 first verifies the digital signature associated with the authentication response to ensure that there has not been any tampering. Once the authentication response is determined to have arrived intact, and is a response to the original authentication request, the contents of the authentication response are analyzed to determine if authentication has been successful. If the authentication was not successful, the merchant system 110 halts the transaction. If the authentication was successful, the merchant system 110 can continue with the transaction by initiating a charge to the electronic commerce card provided by the cardholder. In an embodiment, the merchant system 110 charges the electronic commerce card by submitting the card information to a card acquirer 144. The card acquirer then sends the charge request over a private card association network 148 to be processed by the electronic commerce card issuer associated with the card.

In a further embodiment, an electronic commerce indicator and a Cardholder Authentication Verification Value (CAVV), which indicates that the electronic commerce card has been successfully verified, is included with the charge request.

Because of the decentralized nature of the electronic commerce card authentication system used in system 100, merchants and card issuers are required to implement their respective portions of the authentication system in order for the system to function properly. In order to encourage widespread implementation of the authentication system by the numerous different card issuers and merchants, in an embodiment of the invention, the card association assigns liability for fraudulent transaction based upon a party's compliance with the authentication system. For example, the card association can specify that if a merchant implements its portion of the authentication system, the merchant will not be responsible for the cost of fraudulent transactions. This provides an incentive to merchants to implement the authentication system.

As an additional incentive, an embodiment of the invention also shifts liability for fraudulent transactions away from the merchant and onto the card issuer when the merchant complies with the authentication system, even in cases where the card issuer does not support authentication. Rewarding merchants for their "good-faith" effort to authenticate cardholders creates an incentive for merchants to implement authentication in as many transactions as possible. Additionally, as this embodiment imposes liability on card issuers for fraudulent transactions regardless of their compliance with the authentication system, card issuers have the incentive to implement authentication to mitigate their risks as much as possible.

Figure 2:
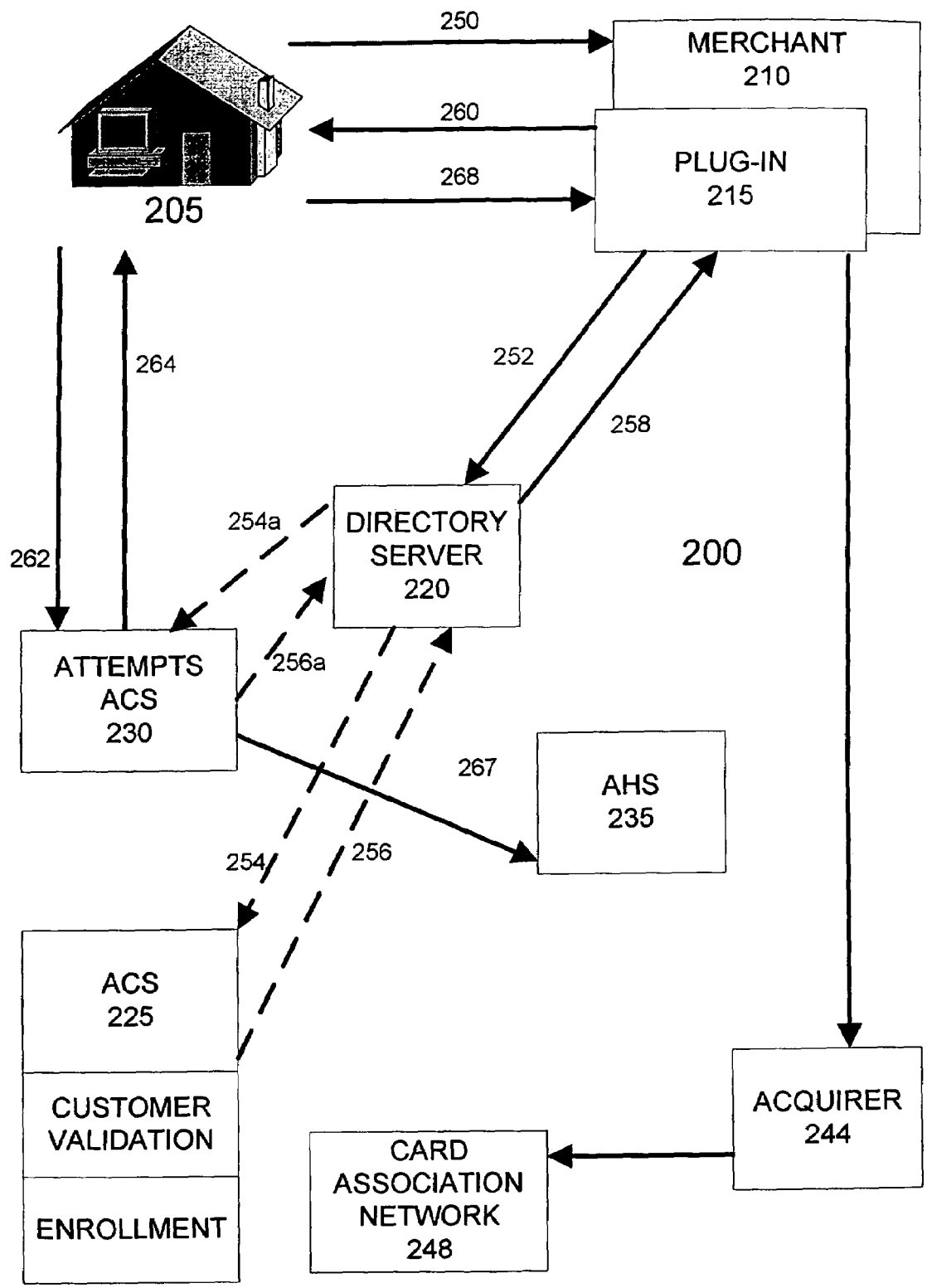
FIG. 2 illustrates an example card authentication system according to an embodiment of the invention.

In order to implement this incentive of shifting liability for fraudulent transactions, an embodiment of the card processing system includes the ability to track and record attempts by merchants to initiate authentications, even in circumstances where the card issuer does not support authentication or can not authenticate the card information its receives. FIG. 2 illustrates an example of this embodiment of the card processing system 200 according to an embodiment of the invention.

In card processing system 200, cardholder system 205 initiates an online purchase by accessing a merchant computer 210. In an embodiment, cardholder system 205 accesses a website provided by the merchant computer 210 via the Internet using a web browser. Alternatively, cardholder system 205 can access the merchant computer 210 via an alternate electronic communications network. The cardholder system 205 can be any type of communications device, for example a personal computer, a personal digital assistant, or a telephone. To complete a purchase, a cardholder uses the cardholder system 205 to submit her electronic commerce card information 250 to the merchant system 210.

In response to the electronic commerce card information 250, the merchant system 210 initiates an authentication procedure to determine whether the electronic commerce card information is valid and has been provided by an authorized cardholder. To authenticate the electronic commerce card information 250, the merchant system 210 contacts the directory server 220. The directory server 220 maintains a directory specifying the location and capabilities of all card issuer systems in the card processing system 200. The capabilities of card issuer systems include whether the card issuer system supports authentication.

The merchant system 210 sends a verifying enrollment request (VEReq) 252 to the directory server 220 to locate the appropriate card issuer system. In an embodiment, all authentication-related communication is coordinated by an authentication plug-in 215 integrated with the merchant system 210. The VEReq 252 includes at least a portion of the electronic commerce card information 250 to be used by the directory server 220 to identify the card issuer system associated with the cardholder's electronic commerce card. In an embodiment, each electronic commerce card issuer is assigned a different range of electronic commerce card numbers. This embodiment of the directory server 220 includes a list of all electronic commerce card issuers and their associated electronic commerce card number ranges. By comparing the electronic commerce card information with the list of electronic commerce card issuers, the directory server 220 is able to identify the appropriate card issuer system.

After identifying the card issuer system, the directory server 220 determines if the card issuer supports authentication. If the card issuer does not support authentication, the directory server 220 creates and sends a special "attempted" verifying enrollment response (VERes) 258 to the merchant system 210. As discussed below, the attempted VERes 258 includes information, such as a URL, locating a website operated by a special attempts ACS.

If the directory server 220 determines that the ACS associated with the card issuer does support authentication, the directory server 220 forwards the VEReq 254 to an access control server (ACS) 225 associated with the card issuer's authentication service. The ACS 125 determines whether the card information provided in the VEReq 154 can be authenticated. Card information may not be able to be authenticated by the ACS 125 if, for example, the card information does not include a valid electronic commerce card number, or if there is no authentication information, such as a password or other identifying information, associated with the electronic commerce card number.

In an embodiment of the invention, if the ACS 225 does not respond to the VEReq 254, because, for example, it is not operating or is unable to authenticate the card information, or if the directory server 220 determines that the card issuer does not support authentication, the directory server 220 sends the VEReq 254a to the attempts ACS 230 with an indicator that authentication cannot be performed by the ACS 225. The indicator informs the attempts ACS 230 of the reason that authentication cannot be performed, for example, the cardholder has not provided authentication information for her card, the card issuer is not participating in the authentication system, the directory server 220 timed out waiting for a response from the card issuer's ACS 225, or some other error occurred.

In response to receiving the VEReq 254a, the attempts ACS 230 generates VERes 256a that includes a pseudonym for the card information and the location of the attempts ACS, such as a URL. The attempts ACS 230 returns the VERes 256a to the directory server 230 to be forwarded to the merchant system 210. In another embodiment, if the card information cannot be authenticated by the ACS 225, the ACS 225 creates and sends an attempted VERes 256 to the directory server 220, which in turn forwards the attempted VERes 258 to the merchant system 210.

If the electronic commerce card information provided in the VEReq 154 can be authenticated, the ACS 125 sends a normal verified enrollment response (VERes) 156 back to the directory server 120, and the authentication proceeds as described in system 100.

The attempted VERes 258 includes a message indicating that authentication can be attempted by the merchant and a pseudonym corresponding to the card number. The pseudonym can be any type of code or number that can be uniquely linked to card information at a later time. The attempted VERes also includes a URL to be accessed by the cardholder system 205 to record the authentication attempt. For system 200, the URL is associated with a web site provided by the Attempts ACS 230. In an embodiment, the Attempts ACS 230 is operated by the card association.

Upon receiving an attempted VERes from the directory server 220, the merchant system 210 generates an authentication request. The authentication request includes the pseudonym included with the attempted VERes and transaction information associated with the cardholder's prospective purchase. The merchant system then forwards the authentication request 260 to the cardholder system 205. In an embodiment, the authentication request is sent to the cardholder system 205 with a web page having a redirection command, such as an HTTP redirect, to a web site hosted by the Attempts ACS 230. This web page also includes a URL for returning information to the merchant system 210.

In response the authentication request, the cardholder system 205 accesses 262 a web site hosted by the Attempts ACS 230. In accessing this web site, the cardholder system 205 supplies the Attempts ACS 230 with the authentication request received from the merchant system 210.

In response to receiving an authentication request from the cardholder system 205, the Attempts ACS 230 determines whether the authentication request is valid. In an embodiment, the authentication information, such as the pseudonym associated with the card information, expires after a limited period of time, for example five minutes, to prevent fraudulent reuse of the authentication request. If the authentication request is determined to be valid, the Attempts ACS 230 generates an authentication tracking number, which uniquely identifies a particular authentication attempt, and an authentication results code, which includes an indicator that identifies the reason for performing an attempted authentication, for example the cardholder has not provided authentication information for her card, the card issuer is not participating in the authentication system, the directory server 220 timed out waiting for a response from the card issuer's ACS 225, or some other error occurred.

The Attempts ACS 230 returns an authentication response 266 to the cardholder system 205 to be forwarded to the merchant system 210. The authentication response is digitally signed to prevent the cardholder system 205 or other third party systems from tampering with the contents of the authentication response. In an embodiment, the Attempts ACS 230 returns an authentication response for every valid authentication request it receives without actually authenticating the cardholder.

In addition to sending the authentication response to the cardholder system 205, a copy of the authentication response 267 is sent to an authentication history server 235. The authentication history server 235 maintains an archive of all authentications attempted in the system 200.

The cardholder system 205 forwards the authentication response 268 to the merchant system 210. The authentication response includes a message indicating that the authentication was attempted. In a further embodiment, the authentication response may also include an error code identifying the reason for authentication failure.

After receiving the authentication response 268, the merchant system 210 validates the authentication response. To validate the authentication response 268, the merchant system 210 first verifies the digital signature associated with the authentication response to ensure that there has not been any tampering. Once the authentication response is determined to have arrived intact, the merchant system 210 can continue with the transaction by initiating a charge to the electronic commerce card provided by the cardholder. In an embodiment, the merchant system 210 charges the electronic commerce card by submitting the card information to a card acquirer 244. The card acquirer then sends the charge request over a private card association network 248 to be processed by the electronic commerce card issuer associated with the card. In a further embodiment, an electronic commerce indicator and a Cardholder Authentication Verification Value (CAVV), which indicates that the electronic commerce card has been successfully verified, is included with the charge request.

In an embodiment, the CAVV is a cryptographic value including data fields enabling the electronic commerce card association to verify that authentication was actually attempted by the merchant. In this embodiment, the CAVV includes the authentication tracking number and authentication results code generated by the Attempts ACS 230 and forwarded to the merchant system in the authentication response 268. The CAVV may also include card information, such as an account number and expiration date, other information, and a random or unpredictable number. A card association can use the data fields in the CAVV to link the data collected by the authentication attempt with the data submitted in the charge request.

If the electronic commerce card used to complete the transaction turned out to have been fraudulently used, either the merchant or the card association can refer back to its copy of the authentication response to determine whether the merchant or the card issuer should be responsible for the costs of the fraudulent transaction.

Although the invention has been discussed with respect to specific embodiments thereof, these embodiments are merely illustrative, and not restrictive, of the invention. For example, the present invention can be utilized with any authentication system. Thus, the scope of the invention is to be determined solely by the claims.

What is claimed is:

1. An electronic commerce card authentication system comprising:
   a directory server adapted to:
   receive a verification request message from a merchant system, wherein the verification request message requests an indication of whether a card issuer associated with a card account provides an authentication service;
   determine whether the card issuer associated with the card account provides the authentication service; and
   communicate a verification response message with the merchant system in response to a determination that the card issuer associated with the card account does not provide the authentication service, wherein the verification response message instructs the merchant system to submit an authentication request.

2. The electronic commerce card authentication system of claim 1, wherein the directory server is adapted to determine whether the card issuer associated with the card account provides the authentication service by identifying the card issuer associated with the card account.

3. The electronic commerce card authentication system of claim 2, wherein the verification request message includes at least a portion of a card number associated with the card account, and wherein the directory server is adapted to compare the portion of the card number with a range of card numbers associated with the card issuer.

4. The electronic commerce card authentication system of claim 1, further comprising:
   an access control server adapted to receive an authentication request message from the merchant system and to communicate an authentication response message with the merchant system, wherein the authentication response message includes an indication that the merchant system attempted an authentication.

5. The electronic commerce card authentication system of claim 4, wherein the verification response message indicates the location of the access control server.

6. The electronic commerce card authentication system of claim 4, wherein the access control server is further adapted to validate the authentication request message.

7. The electronic commerce card authentication system of claim 4, wherein the access control server is further adapted to communicate a copy of the authentication response message with an authentication history server to be archived.

8. The electronic commerce card authentication system of claim 2, wherein the directory server is further adapted to communicate the verification request message with an access control server associated with the card issuer associated with the card account; and
   to communicate a verification response message with the merchant system in response to a determination that the access control server is inoperable, wherein the verification response message instructs the merchant system to submit an authentication request.

9. The electronic commerce card authentication system of claim 2, further comprising an access control server, adapted to:
   receive the verification request message from the directory server;
   determine whether the card issuer associated with the card account provides the authentication service;
   communicate a verification response message with the merchant system in response to a determination that the card issuer associated with the card account does not provide the authentication service wherein the verification response message includes an indication that an authentication should be attempted with a different access control server; and
   communicate a verification response message with the merchant system in response to a determination that the card issuer associated with the card account does provide the authentication service wherein the verification response message includes an indication that an authentication should be attempted with the access control server.

10. The electronic commerce card authentication system of claim 4, further comprising an electronic commerce card association adapted to assign liability for a potentially fraudulent transaction to a card issuer in response to the authentication response message, wherein the authentication response message includes an indication that the merchant system attempted an authentication.

11. A method of initiating an authentication of an electronic commerce card, the method comprising:
   receiving a verification request message from a merchant system, wherein the message requests an indication of whether a card issuer associated with a card account provides an authentication service;
   determining whether the card issuer associated with the card account provides the authentication service; and
   communicating a verification response message with the merchant system in response to a determination that the card issuer associated with the card account does not provide the authentication service, wherein the verification response message instructs the merchant system to submit an authentication request.

12. The method of claim 11, wherein determining includes identifying the card issuer associated with the card account.

13. The method of claim 12, wherein the verification request message includes at least a portion of a card number associated with the card account, and wherein determining further includes comparing the portion of the card number with a range of card numbers associated with the card issuer.

14. The method of claim 11, further comprising:
   receiving an authentication request message from the merchant system; and
   communicating an authentication response message with the merchant system, wherein the authentication response message includes an indication that the merchant system attempted an authentication.

15. The method of claim 14, wherein the verification response message indicates the location of the access control server.

16. The method of claim 14, further including validating the authentication request message.

17. The method of claim 14, further including communicating a copy of the authentication response message with an authentication history server to be archived.

18. The method of claim 12, further including communicating the verification request message with an access control server associated with the card issuer associated with the card account; and
   communicating a verification response message with the merchant system in response to a determination that the access control server is inoperable, wherein the verification response message instructs the merchant system to submit an authentication request.

19. The method of claim 12, further comprising:
   receiving, by an access control server, the verification request message from a directory server;

determining, by the access control server, whether the card issuer associated with the card account provides the authentication service;

communicating, by the access control server, a verification response message with the merchant system in response to a determination that the card issuer associated with the card account does not provide the authentication service wherein the verification response message includes an indication that an authentication should be attempted with a different access control server; and communicating, by the access control server, a verification response message with the merchant system in response to a determination that the card issuer associated with the card account does provide the authentication service wherein the verification response message includes an indication that an authentication should be attempted with the access control server.

20. The method of claim 14, further comprising assigning liability for a potentially fraudulent transaction to a card issuer in response to the authentication response message, wherein the authentication response message includes an indication that the merchant system attempted an authentication.

* * * * *